US008234855B2

(12) United States Patent
Toyama et al.

(10) Patent No.: US 8,234,855 B2
(45) Date of Patent: Aug. 7, 2012

(54) EXHAUST GAS PURIFICATION DEVICE FOR INTERNAL COMBUSTION ENGINE

(75) Inventors: Hiroaki Toyama, Kariya (JP); Morio Narita, Toyota (JP)

(73) Assignees: Kabushiki Kaisha Toyota Jidoshokki, Aichi-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 638 days.

(21) Appl. No.: 12/443,117

(22) PCT Filed: Sep. 26, 2007

(86) PCT No.: PCT/JP2007/068669
§ 371 (c)(1),
(2), (4) Date: Mar. 26, 2009

(87) PCT Pub. No.: WO2008/041583
PCT Pub. Date: Apr. 10, 2008

(65) Prior Publication Data
US 2010/0101216 A1    Apr. 29, 2010

(30) Foreign Application Priority Data
Sep. 27, 2006   (JP) .................................. 2006-262390

(51) Int. Cl.
*F01N 3/00* (2006.01)
(52) U.S. Cl. ................. 60/286; 60/285; 60/295; 60/301; 60/303
(58) Field of Classification Search .................... 60/285, 60/286, 295, 301, 303
See application file for complete search history.

(56) References Cited

U.S. PATENT DOCUMENTS

| | | |
|---|---|---|
| 2005/0028515 A1 | 2/2005 | Fukuma et al. |
| 2005/0161033 A1 | 7/2005 | Okamoto et al. ............. 123/673 |
| 2005/0274106 A1 | 12/2005 | Suzuki et al. |
| 2009/0249770 A1 | 10/2009 | Ogiso |

FOREIGN PATENT DOCUMENTS

| | | |
|---|---|---|
| EP | 1 138 891 | 10/2001 |
| EP | 1 498 594 A1 | 1/2005 |

(Continued)

OTHER PUBLICATIONS

European Search Report for Application No. 07807884.7-2321, dated Oct. 20, 2010.

(Continued)

*Primary Examiner* — Thomas Denion
*Assistant Examiner* — Diem Tran
(74) *Attorney, Agent, or Firm* — Locke Lord LLP

(57) ABSTRACT

An exhaust gas purification device for an internal combustion engine including a plurality of combustion exhaust systems is disclosed. Each of the combustion exhaust system is provided with a cylinder group including a plurality of cylinders, a cylinder head, an exhaust manifold, and an exhaust passage connected to the exhaust manifold for discharging the exhaust gas. In each of the plurality of cylinder groups, the discharge of the exhaust gas from the cylinders is started at an irregular interval and a blank period in which exhaust gas is not discharged from the cylinders exists. The purification device includes a purifier, an additive supply device, and a computer. The purifier purges impurities from the exhaust gas in the exhaust passage. The additive supply device supplies additive to the purifier. The computer controls the additive supply device so that each additive supply device intermittently performs a continuous supply of additive and performs the continuous supply of additive throughout the entire blank period in the corresponding combustion exhaust system.

20 Claims, 3 Drawing Sheets

FOREIGN PATENT DOCUMENTS

| | | | |
|---|---|---|---|
| JP | 2001-280125 | | 10/2001 |
| JP | 2003-201836 | | 7/2003 |
| JP | 2005-120898 | * | 5/2005 |
| JP | 2006-022787 | | 1/2006 |
| JP | 2005-133568 | | 5/2006 |
| JP | 2006-152845 | | 6/2006 |
| WO | 2006/095917 A1 | | 9/2006 |

OTHER PUBLICATIONS

International Preliminary Report on Patentability mailed Mar. 31, 2009 for the corresponding PCT Application No. PCT/JP2007/068669.

* cited by examiner

EXHAUST GAS PURIFICATION DEVICE FOR INTERNAL COMBUSTION ENGINE

FIELD OF THE INVENTION

The present invention relates to an exhaust gas purification device for an internal combustion engine provided with an additive supply device for supplying additive to a catalyst that purges impurities contained in exhaust gas.

BACKGROUND OF THE INVENTION

An exhaust gas purification device is normally used to purify exhaust gas with a catalyst arranged in an exhaust passage of an engine. For instance, the catalyst purges NOx by causing a reaction between NOx and HC in the exhaust gas. However, a sufficient amount of HC is not contained in the exhaust gas of a diesel engine. Accordingly, in patent documents 1 to 3, additive devices supply catalysts with diesel oil, which serves as fuel, as an additive to compensate for the lack of HC.

In the structures disclosed in patent documents 1, 2, an additive nozzle for supplying additive is attached to a branched pipe of an exhaust manifold. In this structure, the additive injected from the additive nozzle is blown back by the pressure of the exhaust gas discharged from the cylinders. This results in a shortcoming in which the blown-back additive clogs the additive nozzle.

[Patent Document 1] Japanese Laid-Open Patent Publication No. 2001-280125
[Patent document 2] Japanese Laid-Open Patent Publication No. 2003-201836
[Patent document 3] Japanese Laid-Open Patent Publication No. 2006-22787

SUMMARY OF THE INVENTION

It is an object of the present invention to prevent additive that is injected from an additive nozzle from being blown back in an internal combustion engine in which the discharge of exhaust gas from cylinders is started at an irregular interval in each of a plurality of cylinder groups.

To achieve the above object, one aspect of the present invention provides an exhaust gas purification device for an internal combustion engine. The engine includes a plurality of combustion exhaust systems. Each combustion exhaust system is provided with a cylinder group, a cylinder head, an exhaust manifold, and an exhaust passage. The cylinder group includes a plurality of cylinders, each of which accommodates a piston. The cylinder head defines combustion chambers in the cylinders and includes exhaust ports respectively corresponding to the cylinders. The exhaust manifold is connected to the cylinder head for merging exhaust gas discharged from the plurality of exhaust ports. The exhaust passage is connected to the exhaust manifold for discharging the merged exhaust gas. The discharge of the exhaust gas from the cylinders is started at an irregular interval and a blank period in which exhaust gas is not discharged from the cylinders exists in each of the plurality of cylinder groups. The purification device includes a purifier, an additive supply device, and a control unit. The purifier is provided for each of the combustion exhaust systems to purge impurities from the exhaust gas in the corresponding exhaust passage. The additive supply device is provided for each of the combustion exhaust systems and arranged in the exhaust port or a branch pipe of the exhaust manifold to supply additive to the corresponding purifier. The control unit controls the additive supply devices so that each additive supply device intermittently performs continuous supply of additive and performs the continuous supply of additive throughout the entire blank period in the corresponding combustion exhaust system.

DETAILED DESCRIPTION OF THE PREFERRED EMBODIMENTS

One embodiment of the present invention will now be described with reference to FIGS. 1 to 4.

Figure 1:
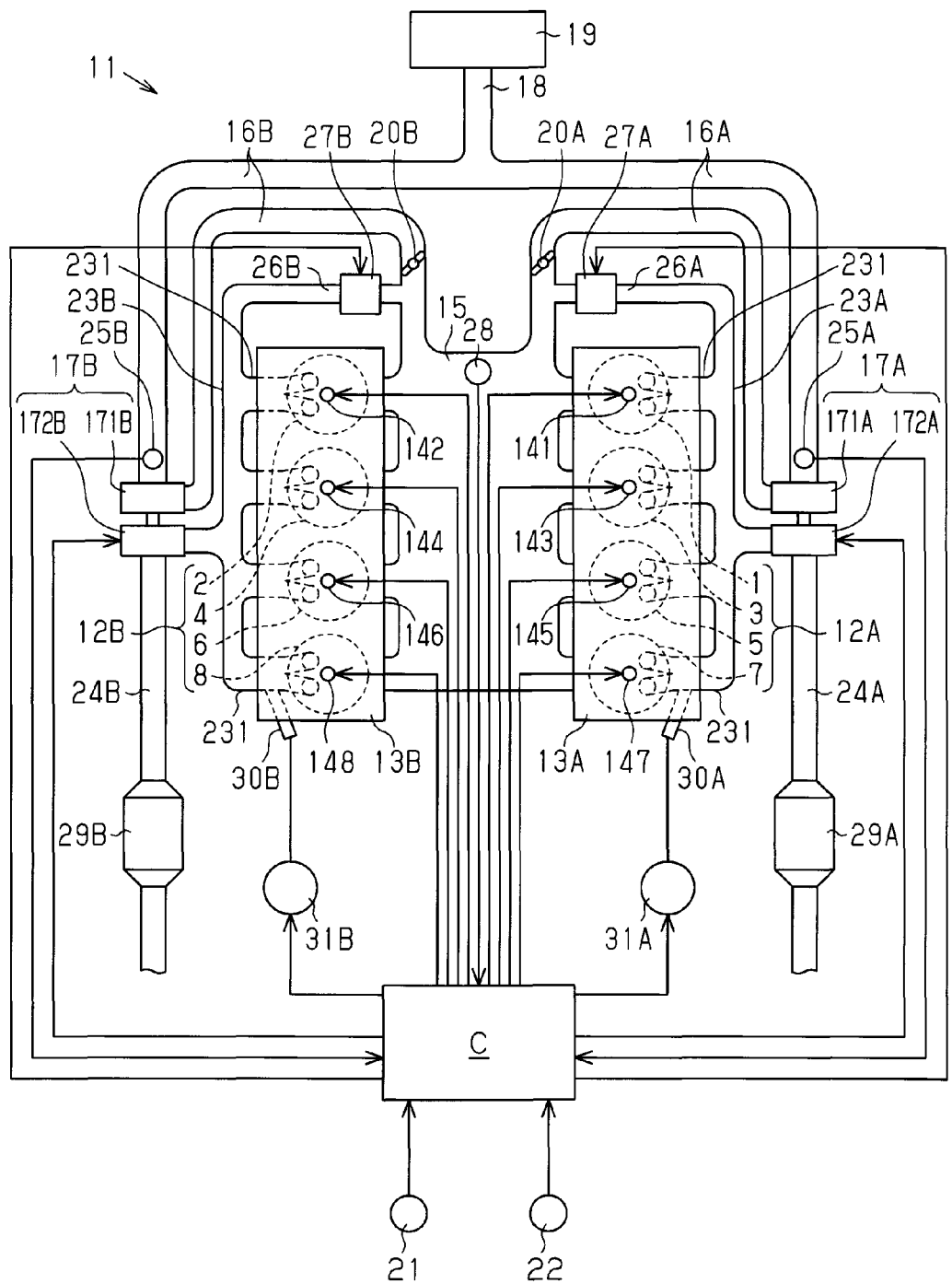
FIG. 1 is a diagram showing the entire structure of an exhaust gas purification device according to one embodiment of the present invention.

As shown in FIG. 1, a diesel engine 11 mounted on a vehicle includes a plurality of cylinders 1, 2, 3, 4, 5, 6, 7, and 8. The engine 11 is a V-type eight-cylinder, four-cycle engine. The cylinders 1, 3, 5, and 7 form a first cylinder group 12A, and the cylinders 2, 4, 6, 8 form a second cylinder group 12B. A cylinder head 13A is mounted for the first cylinder group 12A so as to arrange fuel injection nozzles 141, 143, 145, and 147 in correspondence with the cylinders 1, 3, 5, and 7. A cylinder head 13B is mounted for the second cylinder group 12B so as to arrange fuel injection nozzles 142, 144, 146, and 148 in correspondence with the cylinders 2, 4, 6, and 8. The fuel injection nozzles 141 to 148 inject fuel, that is, diesel oil, into the corresponding cylinders 1 to 8.

Figure 4A:
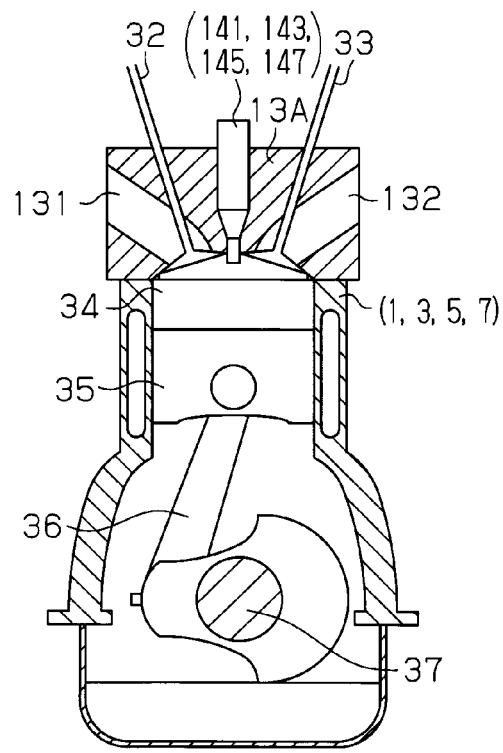
FIGS. 4(a) and 4(b) are cross-sectional side views of a cylinder shown in FIG. 1.

A plurality of intake ports 131 and a plurality of exhaust ports 132 are formed in the cylinder head 13A. As shown in FIG. 4(a), one end of each intake port 131 is in communication with a combustion chamber 34 defined in a corresponding one of the cylinders 1, 3, 5, and 7, and the other end of each intake port 131 is connected to a corresponding branch pipe of an intake manifold 15 (refer to FIG. 1). One end of each exhaust port 132 is in communication with the combustion chamber 34 in a corresponding one of the cylinders 1, 3, 5, and 7, and the other end of each exhaust port 132 is connected to a corresponding branch pipe 231 of an exhaust manifold 23A (refer to FIG. 1).

Figure 4B:
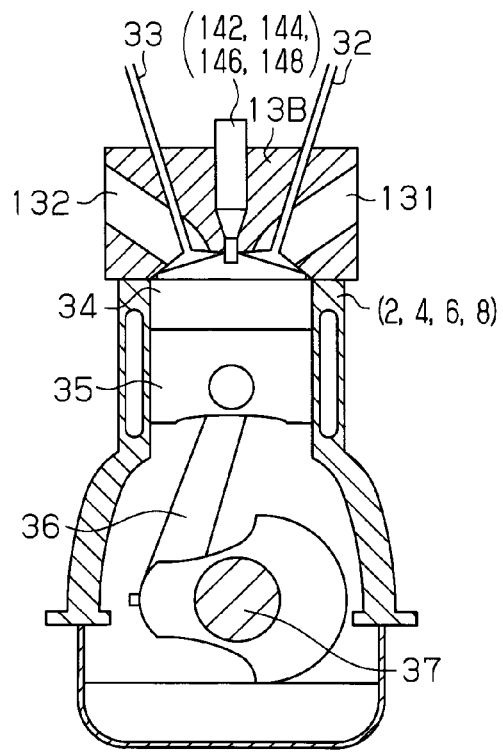

A plurality of intake ports 131 and a plurality of exhaust ports 132 are formed in the cylinder head 13B. As shown in FIG. 4(b), one end of each intake port 131 is in communication with the combustion chamber 34 in a corresponding one of the cylinders 2, 4, 6, and 8, and the other end of each intake port 131 is connected to a corresponding branch pipe of the intake manifold 15 (refer to FIG. 1). One end of each exhaust port 132 is in communication with the combustion chamber 34 in a corresponding one of the cylinders 2, 4, 6, and 8, and the other end of each exhaust port 132 is connected to the corresponding branch pipe 231 of an exhaust manifold 23B (refer to FIG. 1).

An intake valve 32 opens and closes the intake port 131, and an exhaust valve 33 opens and closes the exhaust port 132. A piston 35, which defines the combustion chamber 34 in a corresponding one of the cylinders 1 to 8, is coupled to a crankshaft 37 by a connecting rod 36. Reciprocation of the piston 35 is converted to rotation of the crankshaft 37 by the connecting rod 36.

As shown in FIG. 1, the intake manifold 15 is connected to branch intake passages 16A and 16B. A compressor 171A for a supercharger 17A is arranged in the branch intake passage 16A, and a compressor 171B for a supercharger 17B is arranged in the branch intake passage 16B. Each of the superchargers 17A and 17B is a known variable nozzle type turbo charger that is operated by the flow of exhaust gas.

The branch intake passages 16A and 16B are connected to a main intake passage 18. The main intake passage 18 is connected to an air cleaner 19 and is in communication with the atmosphere through the air cleaner 19. A throttle valve 20A is arranged in the branch intake passage 16A at a portion between the supercharger 17A and the intake manifold 15. A throttle valve 20B is arranged in the branch intake passage 16B at a portion between the supercharger 17B and the intake manifold 15. Each of the throttle valves 20A and 20B adjusts the flow rate of air drawn into the corresponding branch intake passage 16A and 16B through the air cleaner 19 and the main intake passage 18. The opening degree of each of the throttle valves 20A and 20B is adjusted by a computer C, which will be described later, in accordance with a depression amount of an accelerator pedal (not shown) or other engine operation states.

The depression amount of the accelerator pedal is detected by a pedal depression amount detector 21. A rotation angle (crank angle) of the crankshaft 37 shown in FIGS. 4(a) and 4(b) is detected by a crank angle detector 22. Pedal depression amount information of the pedal depression amount detector 21 and crank angle information of the crank angle detector 22 are provided to the computer C. The computer C calculates a fuel injection period (injection start timing and injection end timing) for each of the fuel injection nozzles 141 to 148 based on the pedal depression amount information and the crank angle information to control the injection of fuel from each of the fuel injection nozzles 141 to 148. The computer C calculates the engine speed based on the crank angle information. The computer C and the crank angle detector 22 form an engine speed detector.

The air drawn into the main intake passage 18 is distributed to the branch intake passages 16A and 16B, and the air flowing through the branch intake passages 16A and 16B merge in the intake manifold 15. That is, the intake air sent from the corresponding compressors 171A and 171B of the superchargers 17A and 17B merges in the intake manifold 15 before being supplied to the cylinders 1 to 8.

The exhaust gas generated in the cylinders 1, 3, 5, and 7 is discharged into the exhaust manifold 23A, and the exhaust gas generated in the cylinders 2, 4, 6, and 8 is discharged into the exhaust manifold 23B. The exhaust manifold 23A is connected to a first exhaust passage 24A by a turbine 172A of the supercharger 17A. The exhaust manifold 23B is connected to a second exhaust passage 24B by a turbine 172B of the supercharger 17B.

The first cylinder group 12A, the exhaust manifold 23A, and the first exhaust passage 24A form a first combustion exhaust system. The second cylinder group 12B, the exhaust manifold 23B, and the second exhaust passage 24B form a second combustion exhaust system.

An air flowmeter 25A is arranged in the branch intake passage 16A upstream from the compressor 171A of the supercharger 17A. An air flowmeter 25B is arranged in the branch intake passage 16B upstream from the compressor 171B of the supercharger 17B. The air flowmeter 25A detects the intake air flow rate in the branch intake passage 16A, and the air flowmeter 25B detects the intake air flow rate in the branch intake passage 16B. The information of the intake air flow rate detected by the air flowmeter 25A and the information of the intake air flow rate detected by the air flowmeter 25B are sent to the computer C.

The branch intake passage 16A downstream from the throttle valve 20A is connected to the exhaust manifold 23A by an exhaust gas supply passage 26A. A flow rate adjustment valve 27A is arranged in the exhaust gas supply passage 26A. The branch intake passage 16B downstream from the throttle valve 20B is connected to the exhaust manifold 23B by an exhaust gas supply passage 26B. A flow rate adjustment valve 27B is arranged in the exhaust gas supply passage 26B. The flow rate adjustment valves 27A and 27B are controlled by the computer C.

A pressure detector 28 is arranged in the intake manifold 15. The pressure detector 28 detects pressure (supercharging pressure) in the intake manifold 15. The information of the supercharging pressure detected by the pressure detector 28 is sent to the computer C.

The computer C determines a target supercharging pressure based on engine speed, engine load, or the like by referring to a map, which is set in advance. The computer C obtains the engine speed from changes in the crank angle over a certain time that is detected by the crank angle detector 22. The computer C recognizes the pedal depression amount described above as the engine load. That is, the pedal depression amount detector 21 is an engine load detector, which is one type of an operation state detector. The computer C controls the vane opening degree of the turbines 172A and 172B respectively corresponding to the superchargers 17A and 17B so that the supercharging pressure detected by the pressure detector 28 becomes equal to the target supercharging pressure.

The computer C determines the necessary intake air flow rate from the fuel injection period (fuel injection amount) described above to further determine an exhaust gas target supply rate. The computer C calculates the opening of each of the flow rate adjustment valves 27A and 27B using the information of the intake air flow rate detected by each of the air flowmeters 25A and 25B so as to satisfy the target supply rate. The computer C controls each of the flow rate adjustment valves 27A and 27B so that the opening degree of the adjustment valves 27A and 27B becomes equal to the calculated opening degree. If the opening degree of each of the flow rate adjustment valves 27A and 27B is not zero, some of the exhaust gas in the exhaust manifold 23A and some of the exhaust gas in the exhaust manifold 23B are sent to the intake manifold 15 through the corresponding exhaust gas supply passages 26A and 26B. This lowers the combustion temperature in the combustion chamber of each of the cylinder 1 to 8 and reduces the generation of NOx (nitrogen oxide), which is an impurity.

Purifiers 29A and 29B are respectively arranged in the exhaust passages 24A and 24B. A NOx storage reduction catalyst or NOx selective reduction catalyst is employed as the purifiers 29A and 29B.

An additive nozzle 30A is arranged in the cylinder head 13A, and an additive nozzle 30B is arranged in the cylinder head 13B. The additive nozzle 30A is arranged so as to face the exhaust port 132 of the cylinder 7, and the additive nozzle 30B is arranged so as to face the exhaust port 132 of the cylinder 8. Pumps 31A and 31B are respectively connected to the additive nozzles 30A and 30B. The pump 31A supplies an additive, or diesel oil, to the additive nozzle 30A, and the pump 31B supplies an additive, or diesel oil, to the additive nozzle 30B. The additive nozzle 30A injects the supplied additive into the exhaust port 132 of the cylinder 7, and the additive nozzle 30B injects the supplied additive into the exhaust port 132 of the cylinder 8. The operation of each of the pumps 31A, and 31B is controlled by the computer C. The pump 31A and the additive nozzle 30A form an additive supply device for supplying the additive to the purifier 29A, and the pump 31B and the additive nozzle 30B form an additive supply device for supplying the additive to the purifier 29B. The computer C controlling the injection of the fuel injection nozzles 141 to 148 also controls the operations of the pumps 31A and 31B.

Figure 2:
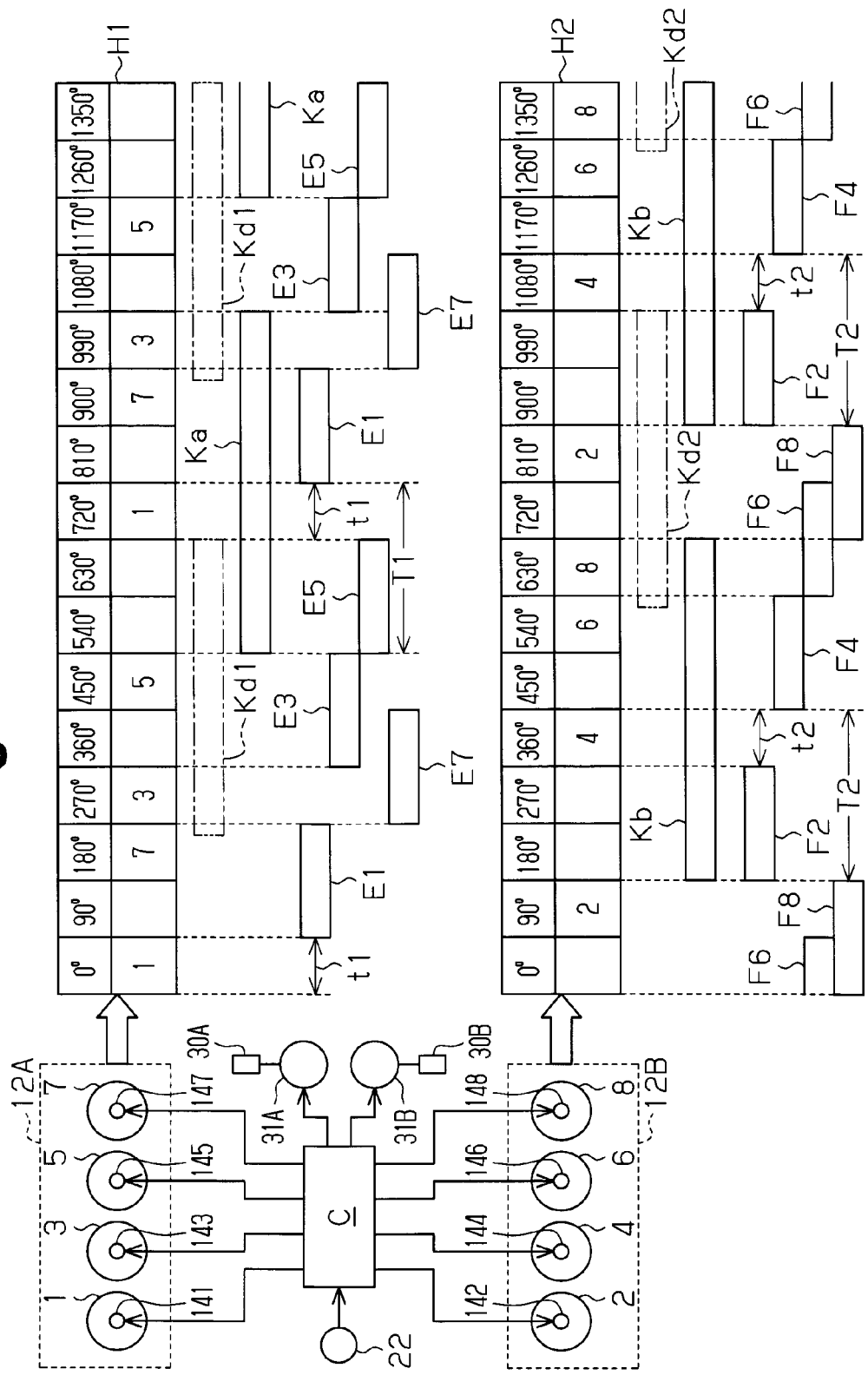
FIG. 2 is a timing chart illustrating additive injection periods of the purification device shown in FIG. 1.

In FIG. 2, table H1 shows the combustion order (in other words, fuel injection order) of the cylinders 1, 3, 5, and 7 in the first cylinder group 12A, and table H2 shows the combustion order (in other words, fuel injection order) of the cylinders 2, 4, 6, and 8 in the second cylinder group 12B. The numbers 1, 2, 3, 4, 5, 6, 7, and 8 in tables H1 and H2 represent the cylinders 1, 2, 3, 4, 5, 6, 7, and 8. The crank angles 0°, 90°, 180°, . . . , 1260°, and 1350° in tables H1 and H2 represent timings corresponding to the bottom dead center position of the piston 35 in the combustion stroke. The computer C performs fuel injection (combustion) in the order of the cylinders 1, 2, 7, 3, 4, 5, 6, and 8. This injection order reduces vibration of the diesel engine 11, or the V-type eight-cylinder engine, and is suitable for increasing intake efficiency. The diesel engine 11, or four-cycle engine, operates so that each cycle corresponds to a crank angle of 720°.

In FIG. 2, periods E1, E3, E5, and E7 show exhaust stroke periods for cylinders 1, 3, 5, and 7, respectively. The periods F2, F4, F6, and F8 show the exhaust stroke periods for the cylinders 2, 4, 6, and 8, respectively. The exhaust stroke period is the period from the start to the end of an exhaust stroke. Specifically, the exhaust stroke period is the period in which the piston 35 that is located at the bottom dead center position immediately after the combustion stroke moves from the bottom dead center position to the upper dead center position. The exhaust valve 33 for opening and closing the exhaust port 132 starts to open the exhaust port 132 slightly earlier than the timing at which the exhaust stroke starts, for example, as early as by a crank angle of about 50°.

As apparent from each start timing of the periods E1, E3, E5, and E7 shown in FIG. 2, in the first cylinder group 12A, the difference in the timings for starting the discharge of exhaust gas between the cylinder 1 and the cylinder 7, the difference in the timings for starting the discharge of exhaust gas between the cylinder 7 and the cylinder 3, the difference in the timings for starting the discharge of exhaust gas between the cylinder 3 and the cylinder 5, and the difference in the timings for starting the discharge of exhaust gas between the cylinder 5 and the cylinder 1 respectively correspond to crank angles of 180°, 90°, 180°, and 270°. That is, the start of discharge of the exhaust gas is carried out at an irregular interval in the order of the cylinders 1, 7, 3, 5 in the first cylinder group 12A. An interval T1 between the start timing of the period E5 and the start timing of the period E1 is the longest in the first cylinder group 12A. Transition from the period E1 to the period E7, transition from the period E7 to the period E3, and transition from the period E3 to the period E5 each occur without any time interval in between. However, transition from the period E5 to the period E1 occurs with a time interval in between, that is, a blank period t1 corresponding to a crank angle of 90°. The blank period t1 is included in the longest interval T1 in the first cylinder group 12A.

As apparent from each start timing of the periods F2, F4, F6, and F8 shown in FIG. 2, in the second cylinder group 12B, the difference in the timings for starting the discharge of exhaust gas between the cylinder 4 and the cylinder 6, the difference in the timings for starting the discharge of exhaust gas between the cylinder 6 and the cylinder 8, the difference in the timings for starting the discharge of exhaust gas between the cylinder 8 and the cylinder 2, and the difference in the timings for starting the discharge of exhaust gas between the cylinder 2 and the cylinder 4 respectively correspond to crank angles of 180°, 90°, 180°, and 270°. That is, the start of discharge of the exhaust gas is carried out at an irregular interval in the order of the cylinders 4, 6, 8, 2 in the second cylinder group 12B. An interval T2 between the start timing of the period F2 and the start timing of the period F4 is the longest in the second cylinder group 12B. Transition from the period F4 to the period F6, transition from the period F6 to the period F8, and transition from the period F8 to the period F2 each occur without any time interval in between. However, transition from the period F2 to the period F4 occurs with a time interval in between, that is, a blank period t2 corresponding to a crank angle of 90°. The blank period t2 is included in the longest interval T2 in the second cylinder group 12B.

Period Ka in FIG. 2 represents the operation period of the pump 31A, or the injection period of the additive nozzle 30A. Period Kb represents the operation period of the pump 31B, or the injection period of the additive nozzle 30B. The computer C operates the pump 31A from the start timing of the exhaust stroke of the cylinder 5 (start timing of the period E5) to the start timing of the exhaust stroke of the cylinder 3 (start timing of the period E3) in the first cylinder group 12A. The computer C operates the pump 31B from the start timing of the exhaust stroke of the cylinder 2 (start timing of the period F2) to the start timing of the exhaust stroke of the cylinder 8 (start timing of the period F8) in the second cylinder group 12B.

The injection period Ka of the additive nozzle 30A includes throughout the blank period t1 between the exhaust stroke period E5 and the exhaust stroke period E1. The injection period Kb of the additive nozzle 30B includes throughout the blank period t2 between the exhaust stroke period F2 and the exhaust stroke period F4.

In the present embodiment, which regenerates the purifiers 29A and 29B that serves as NOx reduction catalysts, the injection of the additive from each of the additive nozzles 30A and 30B is performed, for example, four to six times at an interval corresponding to a crank angle of 180°.

The computer C functions as a control unit for controlling the supply of additive from the additive supply device. The computer C controls the supply of additive so as to continuously supply (inject) additive during the injection periods Ka and Kb throughout the blank periods t1 and t2. A state in which additive is "continuously supplied" refers to a state in which the additive is substantially continuously supplied and includes intermittent supply of an additive in a microscopic sense such as when finely repeating the supply of additive during a duty control that finely repeats activation and deactivation.

Figure 3:
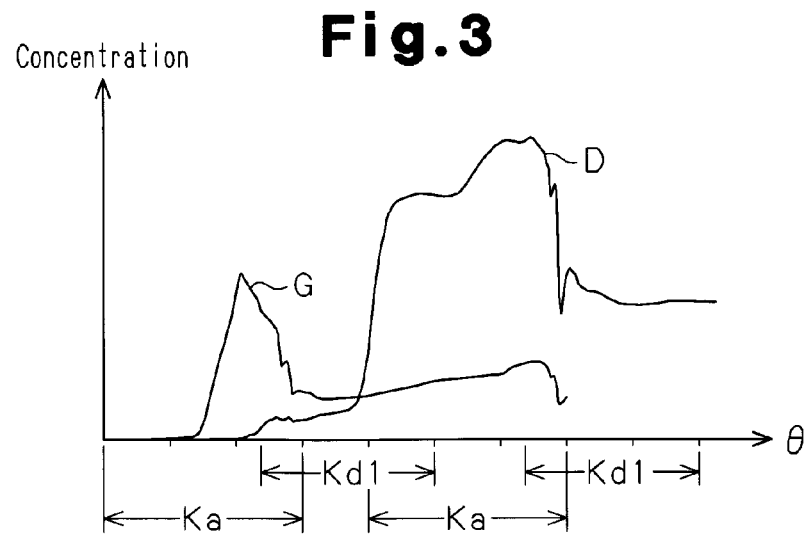
FIG. 3 is a graph showing the concentration of the additive near an additive nozzle for a first cylinder group shown in FIG. 1.

FIG. 3 shows a graph including a curve D indicating changes in concentration of the additive near the additive nozzle 30A when the operation period of the pump 31A (injection period of the additive nozzle 30A) is set to a period Kd1, as shown in FIG. 2. A curve G indicates changes in concentration of the additive near the additive nozzle 30A when the injection period of the additive nozzle 30A is set to the injection period Ka shown in FIG. 2. In the graph, the horizontal axis θ represents the crank angle, and the vertical axis represents the concentration of the additive.

A curve showing changes in concentration of the additive near the additive nozzle 30B when the injection period of the additive nozzle 30B is an injection period Kd2 as shown in FIG. 2 would be similar to curve D. A curve showing changes in concentration of the additive near the additive nozzle 30B when the injection period of the additive nozzle 30B is the injection period Kb as shown in FIG. 2 would be similar to curve G.

The present embodiment has the advantages described below.

(1) As apparent from the graph of FIG. 3, the additive is injected in the injection period Ka that entirely includes the longest blank period t1 in the first cylinder group 12A. In this case, the concentration of the additive near the additive nozzle 30A becomes lower in comparison to a case when the additive is injected in the injection period Kd1 that does not include throughout the longest blank period t1. When the additive is injected (continuously supplied) in the injection period Ka that includes throughout the longest blank period t1, the additive injected from the additive nozzle 30A is less likely to be subjected to the pressure of exhaust gas discharged from the cylinders 1, 3, and 5. This prevents the additive injected from the additive nozzle 30A from being blown back.

In the same manner, the additive is injected in the injection period Kb that entirely includes throughout the longest blank period t2 in the second cylinder group 12B. In this case, the concentration of the additive near the additive nozzle 30B becomes lower in comparison to a case when the additive is injected in the injection period Kd2 that does not include throughout the longest blank period t2. When the additive is injected (continuously supplied) in the injection period Kb that includes throughout the longest blank period t2, the additive injected from the additive nozzle 30B is less likely to be subjected to the pressure of exhaust gas discharged from the cylinders 2, 4, and 6. This prevents the additive injected from the additive nozzle 30B from being blown back.

(2) The injection from the additive nozzle 30A starts from the beginning of the exhaust stroke period E5 so as to include the exhaust stroke period E5 of the cylinder 5 that is discharging exhaust gas immediately before the blank period t1. The injection from the additive nozzle 30B starts from the beginning of the exhaust stroke period F2 so as to include the exhaust stroke period F2 of the cylinder 2 that is discharging exhaust gas immediately before the blank period t2. The control of the additive supply in such a manner is suitable for effectively using the blank periods t1 and t2 during which the influence of the exhaust gas pressure is small.

(3) In the structure for injecting the additive into the exhaust port 132 of the cylinder 7 from the additive nozzle 30A mounted on the cylinder head 13A, the additive is likely to be blown back by the flow of exhaust gas from the cylinders 1, 3, and 5. In the same manner, in the structure for injecting the additive into the exhaust port 132 of the cylinder 8 from the additive nozzle 30B mounted on the cylinder head 13B, the additive is likely to be blown back by the flow of exhaust gas from the cylinders 2, 4, and 6. Thus, the present invention is particularly effective in a structure for injecting the additive into the exhaust ports 132 of the cylinders 7 and 8 from the additive nozzles 30A and 30B mounted on the cylinder head 13A and 13B, respectively.

(4) In order to reduce NOx, the concentration of the additive in the exhaust gas must be increased. Thus, the injection period of the additive must be prolonged during a period corresponding to two reciprocations of a piston 35. The blown back amount of additive would increase if the additive were to be supplied throughout a period corresponding to two reciprocations of the piston 35. However, in the present embodiment, the additive is continuously supplied during a period shorter than two reciprocations of the piston 35 (period in which the crankshaft 37 rotates twice) and including throughout the blank periods t1 and t2. Thus, the present embodiment is optimal for reducing NOx.

(5) In the present embodiment, fuel injection is controlled in the order of cylinders 1, 2, 7, 3, 4, 5, 6, and 8 in the V-type eight-cylinder internal combustion engine that includes the first cylinder group 12A and the second cylinder group 12B, each of which includes four cylinders. In the V-type 8-cylinder internal combustion engine, the start of discharge of exhaust gas from the cylinders is performed at irregular intervals in each cylinder group 12A and 12B. Such an internal combustion engine is optimal for application of the present invention. In FIGS. 2(a), 2(b), 2(c), and 2(d) of patent document 3, various modes for the order of combustion (order of exhaust) of the cylinders 1 to 8 are disclosed. However, the present invention may be applied to an engines regardless of the combustion order of the cylinders as long as the timings for starting the discharge of exhaust gas is performed at irregular intervals in each of a plurality of cylinder groups.

(6) The computer C, which serves as a control unit, controls the additive supply device so that additive is continuously supplied for a period in which the crankshaft is rotated 180° or longer. This ensures that additive is continuously supplied during a blank period in which the influence of the exhaust gas pressure is small. The period in which the crankshaft rotates 180° corresponds to a single stroke of the piston 35, that is, a period during which the piston 35 moves between the upper dead center position and the lower dead center position.

(7) Normally, the timing at which the exhaust valve 33 opened is earlier than the timing at which the combustion stroke shifts to the exhaust stroke. In the present embodiment, additive is continuously supplied during a period in which the exhaust valve 33 is open or longer. This ensures that the continuous supply of additive is performed throughout the entire blank period during which the influence of the exhaust gas pressure is small.

The present invention may be performed as described below.

The injection period Ka may start from the middle of the period E5, and the injection period Kb may start from the middle of the period F2.

The end timing of the injection period Ka may be synchronized with the end timing of the period E7. In this case, the start timing of the injection period Ka may be the middle of the period E5. The exhaust in the period E7 is the exhaust from the cylinder 7, and the exhaust from the cylinder 7 blows the additive in the exhaust port 132 of the cylinder 7 towards the exhaust manifold 23A. That is, the exhaust from the cylinder 7 is effective for preventing the additive from being blown back. Accordingly, the injection of additive from the additive nozzle 30A during the entire period E7 is optimal for increasing the amount of additive while preventing the additive from being blown back.

The end timing of the injection period Kb may be synchronized with the end timing of the period F8. In this case, the start timing of the injection period Kb may be the middle of the period F2. The exhaust in the period F8 is the exhaust from the cylinder 8, and the exhaust from the cylinder 8 blows the additive in the exhaust port 132 of the cylinder 8 towards the exhaust manifold 23B. That is, the exhaust from the cylinder 8 is effective for preventing the additive from being blown back. Accordingly, the injection of additive from the additive nozzle 30B during the entire period F8 is optimal for increasing the amount of additive while preventing the additive from being blown back.

The continuous supply of additive need only be intermittently performed. Specifically, the continuous supply need only be intermittently performed for a period shorter than two reciprocations (for four strokes) of a piston 35. More preferably, the continuous supply need only be performed for a period corresponding to one stroke of a piston 35 or longer and shorter than a period corresponding to two reciprocations of the piston 35. For example, the continuous supply of additive may be performed during the same period as one stroke of a piston 35. By performing the continuous supply of additive during one stroke of the piston 35 or longer (longer than or equal to the period in which the crankshaft rotates 180°), the continuous supply of additive being performed throughout the blank periods t1 and t2 in which the influence of the exhaust gas pressure is small would be ensured.

The additive nozzle 30A may be arranged to inject the additive into the exhaust port 132 of the cylinder 1, and the additive nozzle 30B may be arranged to inject the additive into the exhaust port 132 of the cylinder 2.

The additive nozzle 30A may be arranged to inject the additive into the exhaust port 132 of cylinders other than the cylinders 1 and 7, and the additive nozzle 30B may be arranged to inject the additive into the exhaust port 132 of cylinder other than the cylinders 2 and 8.

The present invention may be applied to regenerate a purifier for particulate matter (PM), which is an impurity, or to regenerate a purifier for sulfur (S), which is an impurity.

A DPNR (diesel particular NOx reduction) system may be employed as the purifiers 29A and 29B. The DPNR system is formed by coating a NOx storage reduction catalyst on a filter base, which corresponds to a DPF (diesel particulate filter), and functions to purge both PM (particulate matter) and NOx.

The present invention may be applied to a V-type diesel engine including an even number cylinders other than eight.

In the embodiment, the additive nozzle is arranged at an exhaust port but may be arranged at a branch pipe of the exhaust manifold.

The invention claimed is:

1. An exhaust gas purification device for an internal combustion engine having a four stroke fuel cycle, wherein the engine includes a plurality of combustion exhaust systems, with each combustion exhaust system provided with a cylinder group including a plurality of cylinders, each of which accommodates a piston, a cylinder head defining combustion chambers in the cylinders and including exhaust ports respectively corresponding to the cylinders, an exhaust valve associated with each exhaust port for opening and closing the exhaust port, an exhaust manifold connected to the cylinder head for merging exhaust gas discharged from the plurality of exhaust ports, and an exhaust passage connected to the exhaust manifold for discharging the merged exhaust gas, the discharge of the exhaust gas from the cylinders being started at an irregular interval and for each fuel cycle, an exhaust period in which one or more exhaust valves are opened to discharge exhaust gas from one or more cylinders and a blank period in which the exhaust valves are closed so that exhaust gas is not discharged from the cylinders existing in each of the plurality of cylinder groups, the purification device comprising:

a purifier provided for each of the combustion exhaust systems to purge impurities from the exhaust gas in the corresponding exhaust passage;

an additive supply device provided for each of the combustion exhaust systems and arranged in the exhaust port or a branch pipe of the exhaust manifold to supply additive to the corresponding purifier; and a control unit for controlling the additive supply devices so that each additive supply device intermittently performs continuous supply of additive and performs the continuous supply of additive during at least a portion of the exhaust period and throughout the entire blank period in the corresponding combustion exhaust system.

2. The device according to claim 1, wherein the quantity of combustion exhaust systems is two, and the engine is a V-type eight-cylinder internal combustion engine in which the cylinder group in each of the two combustion exhaust systems includes four cylinders.

3. The device according to claim 1, wherein the control unit controls the additive supply devices such that the continuous supply period of the additive includes at least part of an exhaust stroke period of the cylinder that is discharging exhaust gas immediately before the blank period starts.

4. The device according to claim 3, wherein the control unit controls the additive supply device so that the additive is continuously supplied during a period in which a crankshaft of the engine rotates 180° or longer.

5. The device according to claim 4, wherein each of the additive supply devices includes an additive nozzle for injecting the additive into one of the plurality of exhaust ports in the corresponding combustion exhaust system.

6. The device according to claim 5, wherein the additive nozzle ends the continuous supply of the additive at a timing when the exhaust stroke ends in the cylinder corresponding to the exhaust port into which the additive nozzle injects the additive.

7. The device according to claim 3, wherein the purifier includes a NOx reduction catalyst.

8. The device according to claim 4, wherein the purifier includes a NOx reduction catalyst.

9. The device according to claim 3, wherein the quantity of combustion exhaust systems is two, and the engine is a V-type eight-cylinder internal combustion engine in which the cylinder group in each of the two combustion exhaust systems includes four cylinders.

10. The device according to claim 1, wherein the control unit controls the additive supply device so that the additive is continuously supplied during a period in which a crankshaft of the engine rotates 180° or longer.

11. The device according to claim 10, wherein each of the additive supply devices includes an additive nozzle for injecting the additive into one of the plurality of exhaust ports in the corresponding combustion exhaust system.

12. The device according to claim 11, wherein the additive nozzle ends the continuous supply of the additive at a timing when the exhaust stroke ends in the cylinder corresponding to the exhaust port into which the additive nozzle injects the additive.

13. The device according to claim 10, wherein the purifier includes a NOx reduction catalyst.

14. The device according to claim 11, wherein the purifier includes a NOx reduction catalyst.

15. The device according to claim 12, wherein the purifier includes a NOx reduction catalyst.

16. The device according to claim 10, wherein the quantity of combustion exhaust systems is two, and the engine is a V-type eight-cylinder internal combustion engine in which the cylinder group in each of the two combustion exhaust systems includes four cylinders.

17. The device according to claim 11, wherein the quantity of combustion exhaust systems is two, and the engine is a V-type eight-cylinder internal combustion engine in which the cylinder group in each of the two combustion exhaust systems includes four cylinders.

18. The device according to claim 12, wherein the quantity of combustion exhaust systems is two, and the engine is a V-type eight-cylinder internal combustion engine in which the cylinder group in each of the two combustion exhaust systems includes four cylinders.

19. The device according to claim 1, wherein the purifier includes a NOx reduction catalyst.

20. The device according to claim 19, wherein the quantity of combustion exhaust systems is two, and the engine is a V-type eight-cylinder internal combustion engine in which the cylinder group in each of the two combustion exhaust systems includes four cylinders.

* * * * *